Figure 1:
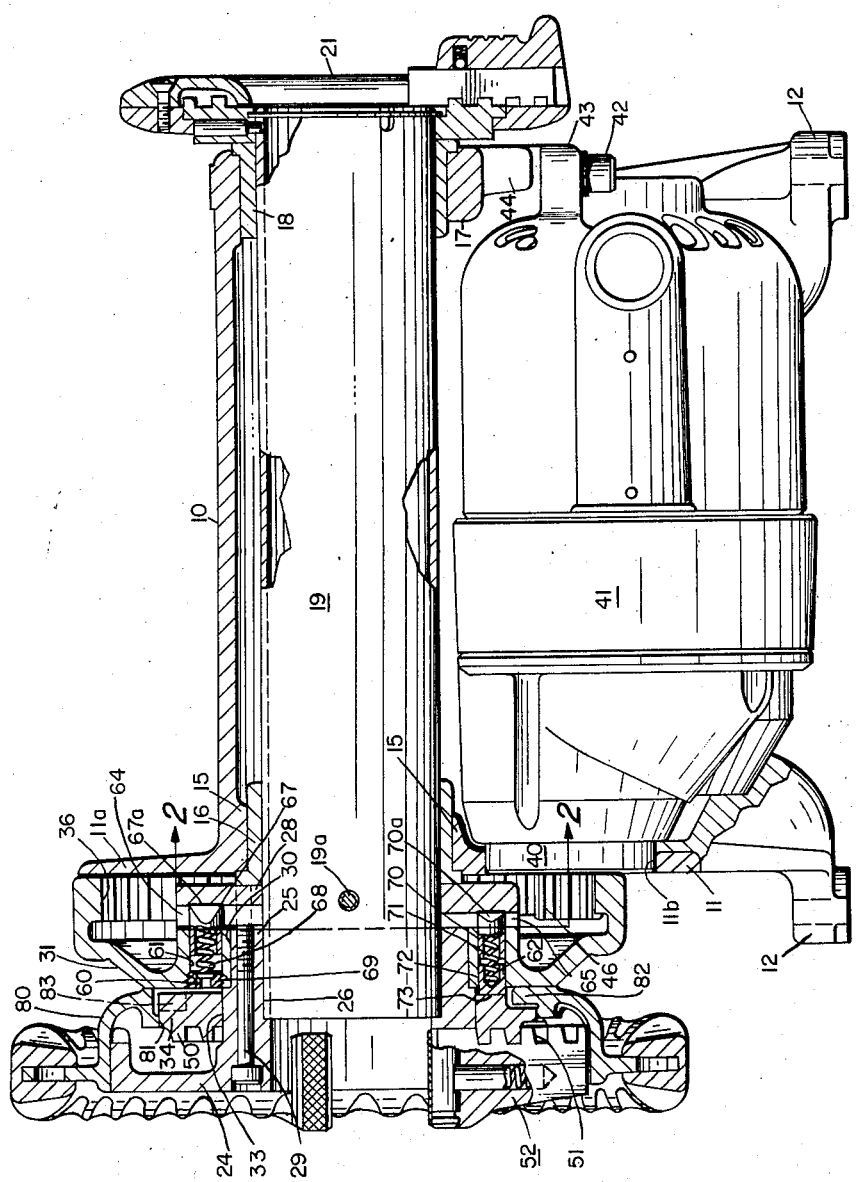

June 23, 1959  A. J. JANIK  2,891,799
QUICK ACTING CHUCK

Filed June 26, 1958  2 Sheets-Sheet 1

INVENTOR.
Anton J. Janik
BY
ATTORNEY

United States Patent Office

2,891,799
Patented June 23, 1959

2,891,799

QUICK ACTING CHUCK

Anton J. Janik, Elyria, Ohio, assignor to The Ridge Tool Company, Elyria, Ohio

Application June 26, 1958, Serial No. 744,699

5 Claims. (Cl. 279—114)

This invention relates to improvements in power drive assembly for use in connection with the turning of pipe for thread cutting operations and more particularly an improved chuck for said assembly.

The chuck per se constitutes an improvement in a chuck shown in the patent to Anton J. Janik, No. 2,756,061, of July 24, 1956.

The present invention provides an improvement in that the power is applied close to the point where the chuck grips the work and not to the drive shaft. It is therefore possible to use a much lighter weight shaft, since the shaft is merely a support shaft. In addition, the shaft can be made very cheaply because it requires less surfaces that are accurately machined.

Furthermore, the construction is such that the machining of the other parts is made simpler, reducing the labor as well as the cost of the materials.

Still other advantages of the invention, and the invention itself, will become more apparent from the following description of an embodiment thereof which is illustrated by the accompanying drawings and forms a part of the specification.

Figure 2:
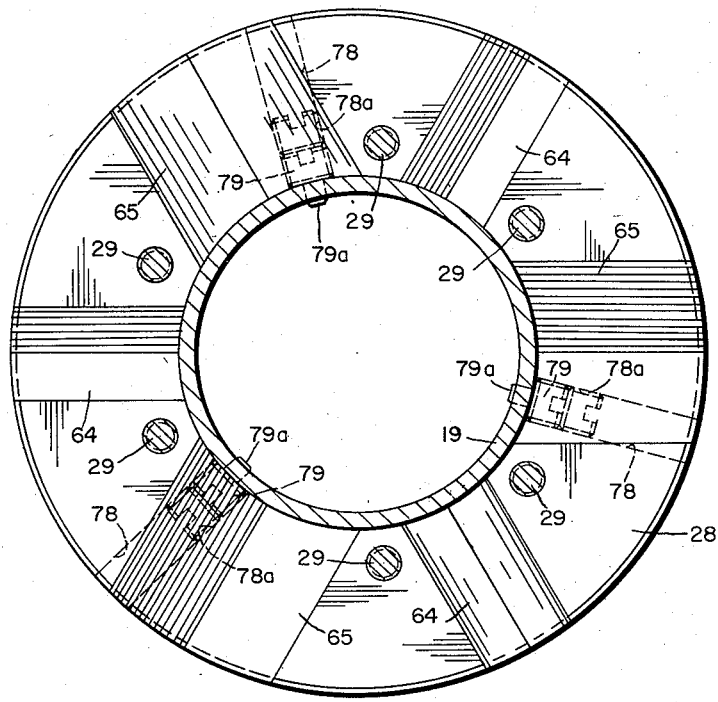

In the drawings:

Fig. 1 is a vertical medial section through a power drive illustrating the invention; and Fig. 2 is a face view of a pressure ring.

Referring now to the drawings, throughout which like parts are designated by like reference characters, there is illustrated a support which includes a top wall 10 and front wall 11 and leg supports 12 connected to the top and/or front walls in any suitable manner.

The front wall is provided with a circular boss 15 arranged to receive an antifriction bearing 16. Likewise spaced from the front wall and suspended from the top, is a rear bearing receiving boss 17 having a bearing 18. A tubular shaft 19 is rotatably journalled in the bearings and is prevented from sliding longitudinally in the bearings by centering device 21 secured in one end of the shaft and the chuck assembly secured on the other end.

A chuck cap or face plate 24 is provided and includes a hub portion 25 having a counterbore 26 and is assembled on the shaft with a snug fit, the inner end of the counterbore providing an abutting engagement with the end of the shaft. Coaxial with the hub is a pressure or cam plate 28 which likewise has a snug fit with the shaft and is rigidly secured to the hub of the face plate by screws 29 extending from the front of the face plate, parallel to the axis of the hub, and threaded into the cam plate. It will be appreciated that a great saving is realized by this construction since, as will later appear, the parts do not need to be secured to the shaft as securely as in the prior devices, due to the fact that the shaft does not partake of any driving effort.

Adjacent to the cam plate, the hub 25 of the face plate 24 is provided with a circumferential seat 30 upon which is rotatably journalled an internal ring gear drive member 31. Adjacent to the seat 30 is a second circumferential seat 33 of larger diameter on which is journalled a scroll plate 34. The seat for the scroll plate is such that the scroll plate may partake of longitudinal, as well as rotational, movement on the seat.

The ring gear 31 is provided with an internal gear 36, the periphery of the element being enlarged for the purpose. The housing 10 is provided with a flange 11a that extends substantially to the periphery of the gear. Below the shaft 19, the flange 11 is provided with an opening 11b for the reception of a boss 40 on the end of a motor 41, the other end of the motor being secured by a screw 42 extending through an eye 43 on the motor and being threaded into a boss 44 extending below the bearing boss 17. The motor shaft carries a spur gear 46 which is in mesh with the internal teeth of the ring gear. The motor may be of the reversible type.

The scroll plate 34 is provided with a spiral land 50 the convolutions of which are shaped substantially as an acme thread except that the outer surface is perpendicular to the base of the plate and the inner faces are slanting. The convolutions of the land intermesh with the teeth 51 of the chuck jaws 52, in a manner and for the purpose clearly set forth in the patent to Anton J. Janik, No. 2,745,670, of May 15, 1956.

Driving engagement of the chuck cap and its jaws is effected by a connection between the ring gear and the pressure plate. The ring gear is provided with a plurality of openings extending through its hub, radially spaced from the bearing surface 30 and circumferentially spaced from each other. Preferably there are six of these openings, alternate ones of these openings are threaded at 60 to thus provide three openings 61 as described and three openings 62 that are smooth throughout their length. These openings are equally spaced and open opposite to cam seats 64 and 65, Fig. 2. The cam seats 64 are radially extending V-shaped surfaces, extending from the inner bearing surface to the periphery of the pressure plate. The cam surfaces 65 are the same general shape but are wider and shallower than the seats 64.

The holes 61, in the hub of the ring gear, house centering and driving means for causing the ring gear to center relative to the pressure plate under normal no load conditions. Each of the drive means comprises a hollow plunger 67 having a wedge shaped face 67a, the shape of which is complementary to the transverse shape of the seat 64. A spring 68 is disposed in the hollow body 67 of the plunger and extends into engagement with a seat in a hollow screw 69 threaded in the threaded part 60 of the bore 61. When the ring is revolved by the motor the plungers 67 are carried with it, and, because of their engagement in the seats 64, a drive is effected to the pressure plate. The skirt of the plunger is sufficiently close to the screw 69 that, regardless of the resistance to the drive, the plunger cannot move out of the seat, since it eventually contacts with the screw 69, although it can ride up on either side of the seat.

The other scroll plate pressure plungers, which engage with the back side of the scroll plate and with the cam pressure plate, each comprise a hollow body 70 having a wedge shaped face 70a which is an obtuse angle and is complementary to a transverse section through the cam surface 65. They are disposed in the bores 62 and have a spring 71 which extends into a hollow cap 72 having a face 73 disposed in pressure engagement with the back side of the scroll plate. Normally the spring 71 forces the plunger and cap apart so that the cap causes the scroll plate to move to the left as viewed in the figures with the land on the scroll plate in substantially complete meshing engagement with the teeth of the chuck jaw.

The pressure plate 28 is also provided with radially extending bores 78 the inner ends of which are threaded and arranged to receive screws 79 having ends 79a arranged to extend into openings 19a in the shaft 19, to provide driving engagement therewith.

A hand wheel 80 is provided for operating the scroll plate and adjusting the chuck jaws inwardly and outwardly. It includes a body which extends over the periphery of the face plate 24 and curves downwardly to provide an annular seat 81 that rides on the periphery of the scroll plate. Lugs 82 on the hand wheel extend between spaced lugs 83 on the scroll plate in the same manner and for the same purpose as described in Patent 2,745,670, namely, for rotating the scroll plate and for enabling the hand wheel to be rotated to strike "hammer" blows on the scroll plate for its final tightening and loosening movement.

The operation of the device will be apparent from the foregoing description, a work piece is positioned between the jaws and the hand wheel rotated to rotate the scroll plate and advance the jaws into contact with the work piece. If the work piece is a pipe the centering device 21 may also be tightened upon the work piece. During the final operation of tightening, the slanting teeth on the chuck jaws being in engagement with the slanting lands on the scroll plate causes a reactive force wherein the slanting surfaces of the teeth on the chuck jaws react with the slant surfaces of the scroll plate land to move the scroll plate to the right from the position as shown. Ultimately, contemplated that the movement of the scroll plate to the right is finally stopped, the parts 72 and 70 of the pressure plunger come together, and the movement is then stopped. It will be appreciated that the scroll plate could contact the ring gear at the same time, but it is preferred that when the parts of the pressure plunger are together that the unit project slightly beyond the face of the ring gear.

The motor 41 is then energized, rotating the spur gear 46 and the ring gear 31. The ring gear carries the drive plungers 67 which have driving engagement with the pressure plate and this movement is transmitted to the cap 24 which carries the chuck jaw with it. At the same time the shaft is rotated, but it will be noted that the driving effort to the work piece is from the ring gear to the pressure ring and thence to the face plate and chuck jaws and that the force applied to the shaft is merely enough to rotate it.

When an operation is performed on the rotating work piece, such as a thread cutting operation, there is a drag thus applied to the face plate and pressure plate, which is in opposition to the driving torque from the motor and ring gear. There is thus a tendency for the ring gear to move slightly relative to the pressure plate. This relative movement causes the wedge shaped surface 70a of the pressure plunger 70—72 to ride up on one of the sides of the cam face 65 moving the pressure assembly 70—72 to the left, forcing the lands on the scroll plate against the teeth of the chuck jaws causing the chuck jaws to move inward and further tightening the chuck jaws on the work piece.

It will be apparent that the drive is considerably simplified over the prior patents. This results in a cheaper installation as well as a smaller installation. The drive to the chuck is more compact and more direct.

Having thus described the invention in an embodiment thereof it will be appreciated that numerous and extensive departures may be made therefrom without departing from the spirit of the invention as defined by the appended claims.

I claim:

1. An apparatus of the class described comprising a support, a tubular shaft rotatably supported in said support, a chuck cap having a hub disposed on the end of said shaft, a pressure plate connected to said hub and extending about said shaft, said hub being formed with a bearing surface, and a ring gear having a hub portion journalled on said bearing surface, said ring gear having openings through the hub radially and circumferentially spaced about the axis thereof, coupling means for connecting the ring gear to the pressure plate for providing a driving relation therebetween, a scroll plate journalled on said hub and chuck jaws radially journalled in the chuck cap and in meshing engagement with the scroll plate, said connecting means being in engagement with the scroll plate.

2. A device as described in claim 1, wherein the meshing engagement between the scroll plate and chuck jaws is variable and is determined by the pressure therebetween.

3. A device as described in claim 1, wherein a motor is carried by the support and a gear on the motor is in driving engagement with the ring gear.

4. A device as described in claim 3, wherein the ring gear is an internal ring gear.

5. An apparatus of the class described comprising a support, spaced bearing means carried by the support and a drive shaft rotatably journalled in said bearing means, a chuck face plate having a hub carried on an end of said shaft, a pressure plate connected to said hub and extending around the shaft, said pressure plate having a plurality of radially extending circumferentially spaced cam surfaces, an internal gear having a hub rotatably journalled on the face plate hub, a wall on said support extending in proximity to the periphery of the ring gear and motor means carried by the support and having a drive gear in mesh with the ring gear, said drive gear hub having a plurality of openings extending longitudinally therethrough spaced from each other and the inner surface of the hub, and spring pressure connector means disposed in said openings and having wedge shaped surfaces in engagement with said cam surfaces, a scroll plate journalled on the hub and having a face engaging said connector means and chuck jaws engaging lands on the opposite sides, chuck jaws carried in radial ways in the face plate and having portions in meshing engagement with the scroll plate.

References Cited in the file of this patent

UNITED STATES PATENTS

| | | |
|---|---|---|
| 2,744,757 | Chasar | May 8, 1956 |
| 2,745,670 | Janik | May 15, 1956 |
| 2,756,061 | Janik | July 24, 1956 |